(12) United States Patent
Mabuchi et al.

(10) Patent No.: US 7,396,042 B2
(45) Date of Patent: Jul. 8, 2008

(54) AIRBAG APPARATUS AND AIRBAG FOLDING METHOD

(75) Inventors: Satoshi Mabuchi, Aichi-ken (JP); Atsushi Kashio, Aichi-ken (JP); Takanori Kanto, Aichi-ken (JP); Eiji Sato, Aichi-ken (JP); Motoaki Naruse, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 359 days.

(21) Appl. No.: 11/220,526

(22) Filed: Sep. 8, 2005

(65) Prior Publication Data

US 2006/0108777 A1    May 25, 2006

(30) Foreign Application Priority Data

Sep. 8, 2004   (JP)   .............. 2004-261266
Sep. 22, 2004  (JP)   .............. 2004-275926

(51) Int. Cl.
*B60R 21/16*   (2006.01)

(52) U.S. Cl. .................................. 280/730.2
(58) Field of Classification Search .............. 280/730.2, 280/743.1

See application file for complete search history.

(56) References Cited

U.S. PATENT DOCUMENTS

| | | | | |
|---|---|---|---|---|
| 5,632,506 | A * | 5/1997 | Shellabarger | 280/743.1 |
| 5,765,867 | A * | 6/1998 | French | 280/743.2 |
| 5,791,685 | A * | 8/1998 | Lachat et al. | 280/743.1 |
| 5,918,898 | A * | 7/1999 | Wallner et al. | 280/728.2 |
| 6,142,507 | A * | 11/2000 | Okuda et al. | 280/730.2 |
| 6,231,069 | B1 * | 5/2001 | Yokoyama | 280/730.2 |
| 6,270,113 | B1 * | 8/2001 | Wipasuramonton et al. | 280/730.2 |

(Continued)

FOREIGN PATENT DOCUMENTS

| | | |
|---|---|---|
| JP | A-09-086329 | 3/1997 |
| JP | A-10-297409 | 11/1998 |
| JP | A-2001-114060 | 4/2001 |

OTHER PUBLICATIONS

Office Action from Chinese Patent Office issued on Jan. 19, 2007 for the corresponding Chinese patent application No. 200510098467.5.

*Primary Examiner*—Faye M. Fleming
(74) *Attorney, Agent, or Firm*—Posz Law Group, PLC

(57) ABSTRACT

An airbag apparatus according to the present invention includes a gas generator and an airbag. The airbag includes a panel sheet and a recess defined inwardly with respect to the airbag. The airbag is formed in a bag-like shape by folding the panel sheet in two and sewing the circumference of the panel sheet. The panel sheet has a first folding line and an inward folding portion including a line extending from the first folding line and arranged in a circumferential portion of the panel sheet. The inward folding portion includes a second folding line by which the inward folding portion is defined, a third folding line extending along the line extending from the first folding line, and an insertion opening through which the gas generator is inserted into the airbag. The recess is provided by folding the inward folding portion along the second folding line inwardly with respect to the airbag, re-folding the airbag in two along the third folding line, and sewing the circumference of the inward folding portion together with the circumference of the panel sheet.

17 Claims, 10 Drawing Sheets

U.S. PATENT DOCUMENTS 6,331,015 B1 * 12/2001 Doxey et al. ............. 280/743.1
6,447,003 B1    9/2002 Wallentin et al.
6,561,541 B2 * 5/2003 Vendely et al. .......... 280/730.2
6,578,866 B2 * 6/2003 Higashi ................... 280/728.2

* cited by examiner

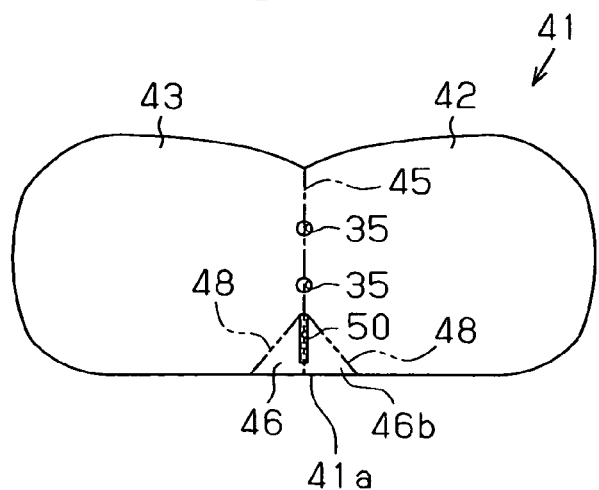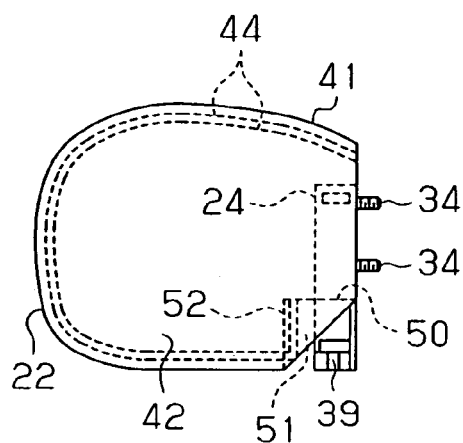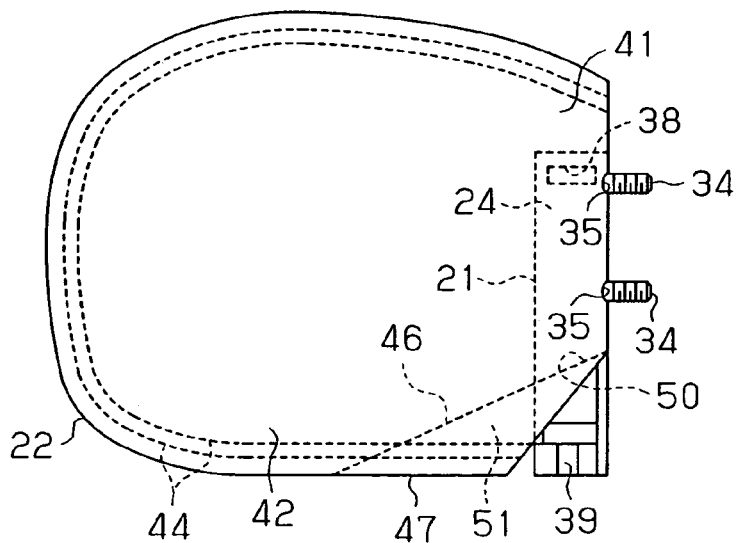

Fig.18B  Fig.18A
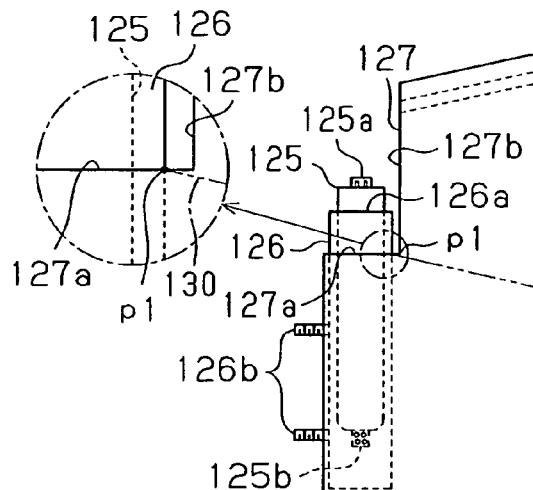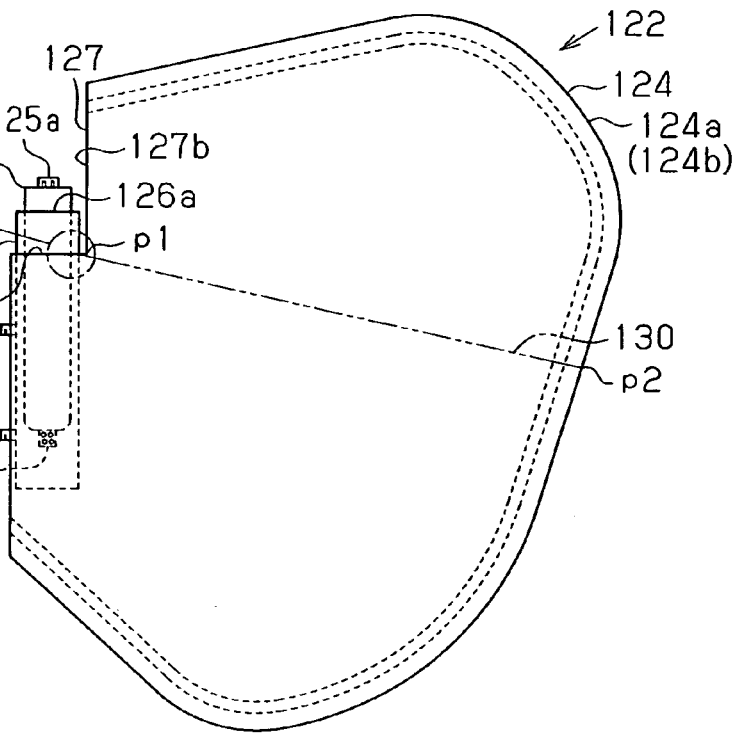
Fig.19A  Fig.19B
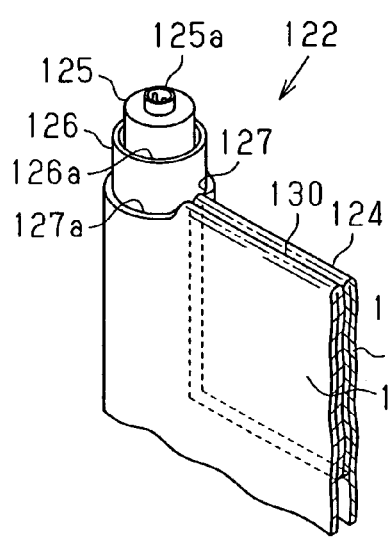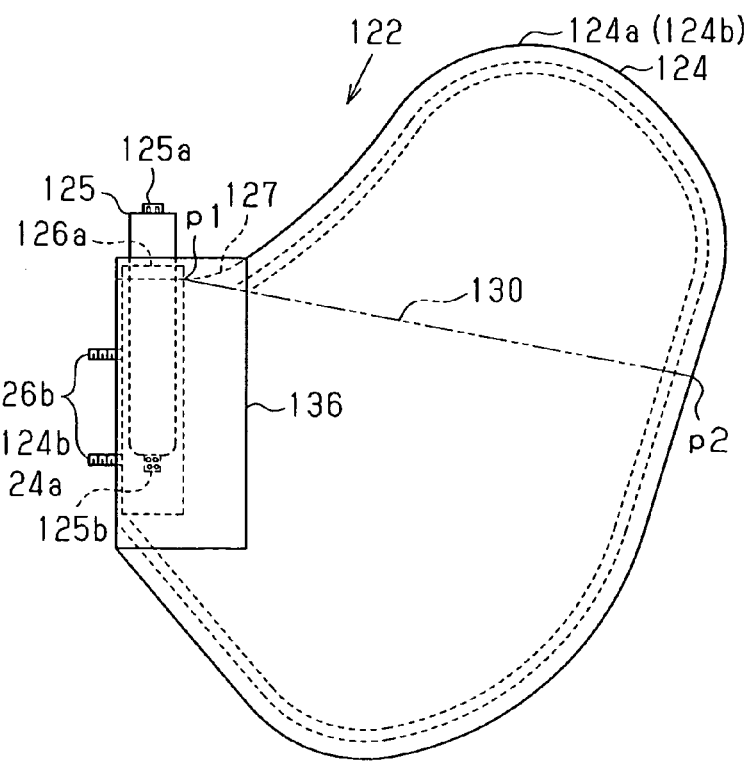

AIRBAG APPARATUS AND AIRBAG FOLDING METHOD

BACKGROUND OF THE INVENTION

The present invention relates to airbag apparatuses and folding methods for airbags that unfold and inflate about an occupant in response to an impact exceeding a predetermined level applied to the body of a vehicle, thus reducing the impact acting on the occupant.

Conventionally, an airbag apparatus includes a gas generator and an airbag that is unfolded and inflated by the gas generated by the gas generator. The gas generator has an inflator for generating the gas and a retainer for fixing the inflator. The airbag may be shaped in different manners depending on positions at which the airbags are installed. For example, Japanese Laid-Open Patent Publication No. 2001-114060 describes a side airbag apparatus including a flat airbag. The airbag is formed in a bag-like shape by folding a panel sheet in two and sewing the circumference of the panel sheet.

In an airbag apparatus, at least the inflator of the gas generator must be arranged in the airbag for unfolding and inflating the airbag by the gas. For this purpose, the airbag is fabricated according to the following steps. First, the circumference of the panel sheet is sewn except for a portion of the circumference that defines an insertion opening through which the inflator is inserted into the airbag. The inflator is then installed in the airbag through the insertion opening. Subsequently, the portion corresponding to the insertion opening, or the non-sewn portion of the circumference of the airbag, is sewn. The insertion opening is thus closed.

For facilitating installation of the gas generator in the airbag, such as insertion of the inflator and the retainer into the airbag and connection of a harness to the inflator, the insertion opening must be relatively large. The insertion opening is made visible from a side of the airbag. Therefore, if the insertion opening remains open, an excessive amount of gas may leak from the insertion opening when the airbag is unfolded and inflated. In this case, the airbag cannot be inflated to a predetermined interior pressure. In order to avoid this, the airbag, the flat type in particular, must be subjected to post treatment of the insertion opening following the sewing step of the panel sheet. In the post treatment, the insertion opening may be closed or reduced in size by sewing the circumferential portion of the airbag corresponding to the insertion opening or blocked by folding the circumferential portion of the airbag corresponding to the insertion opening.

That is, fabrication of the flat airbag requires three steps, sewing the circumference of the panel sheet, installing the gas generator, and performing the post treatment. The production efficiency for the airbag is thus relatively low. Further, although the inflator is received in the airbag, the harness must be projected from the insertion opening to the exterior of the airbag. Therefore, even after the post treatment, a portion of the insertion opening must be maintained open, making it likely for the gas to leak from the open portion. It is thus difficult for the flat airbag to maintain the interior pressure after the airbag is unfolded and inflated. Further, if the circumferential portion corresponding to the insertion opening is sewn in close vicinity to the harness for maximally closing the insertion opening in the post treatment, problems such as damage to the harness or short circuiting of the harness may occur.

SUMMARY OF THE INVENTION

Accordingly, it is an objective of the present invention to provide an airbag apparatus and an airbag folding method for suppressing excessive gas leakage from an insertion opening after inflation of an airbag.

To achieve the foregoing and other objectives and in accordance with the purpose of the present invention, the invention provides an airbag apparatus comprising a gas generator for generating gas and an airbag which is unfolded and inflated by the gas when the gas generator is operated. The airbag includes an insertion opening through which the gas generator is inserted into the airbag. The gas generator includes a portion projecting from the airbag to the exterior through the insertion opening, with the insertion opening being sealed by said portion.

Further, the present invention provides a method of folding an airbag for an airbag apparatus including an inflator for generating gas that unfolds and inflates the airbag and a retainer for receiving the inflator. The airbag apparatus is fixed to an accommodating portion provided in a vehicle passenger compartment through the retainer. The method includes: preparing the airbag in a flattened form and providing an insertion opening through which the retainer is passed; setting at least one contact point by passing the retainer through the insertion opening of the airbag in such a manner that a portion of the retainer projects from the insertion opening and that the retainer is held in contact with an opening end of the insertion opening; setting at least one folding line starting from the contact point and folding the airbag along the folding line; and folding the airbag in a folded state from a distal end of the airbag toward the retainer.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 14A is a side view corresponding to FIG. 5, showing a panel sheet of a first modification in an unfolded state;

FIG. 14B is a side view corresponding to FIG. 1A, showing an airbag of the first modification;

FIG. 15 is a side view corresponding to FIG. 1A, showing an airbag of a second modification;

FIG. 18A is a side view corresponding to FIG. 12A, showing a side airbag apparatus of a fourth modification;

FIG. 18B is a side view corresponding to FIG. 12B, showing the side airbag apparatus of the fourth modification;

FIG. 19A is a perspective view corresponding to FIG. 11, showing a main portion of a side airbag apparatus of a fifth modification; and FIG. 19B is a side view corresponding to FIG. 12B, showing a side airbag apparatus of a sixth modification;

DETAILED DESCRIPTION OF THE PREFERRED EMBODIMENTS

A first embodiment of the present invention will now be described with reference to FIGS. 1A to 8.

Figure 2:
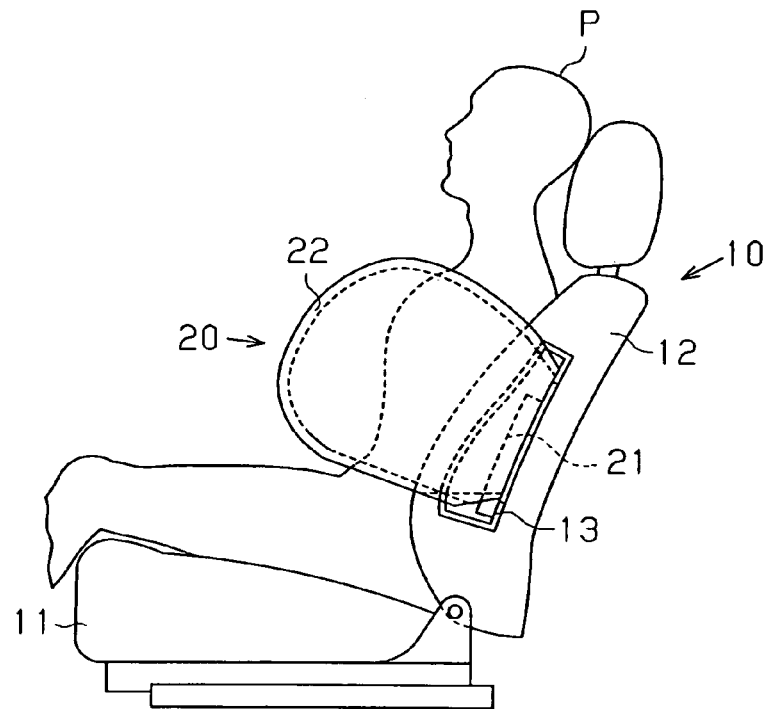
FIG. 2 is a side view showing a side airbag apparatus.

FIG. 2 shows a left-side front seat 10 provided in a passenger compartment. The front seat 10 includes a seating portion 11 and a back 12. A casing 13 is defined in a left side portion of the back 12 and accommodates a side airbag apparatus 20. The side airbag apparatus 20 is arranged as opposed to a non-illustrated door, which forms part of a side of the body of the vehicle. Although only the left-side front seat 10 is illustrated in the drawing, a right-side front seat is also provided and an apparatus identical with the side airbag apparatus 20 is installed in the back of the right-side front seat.

Figure 3:
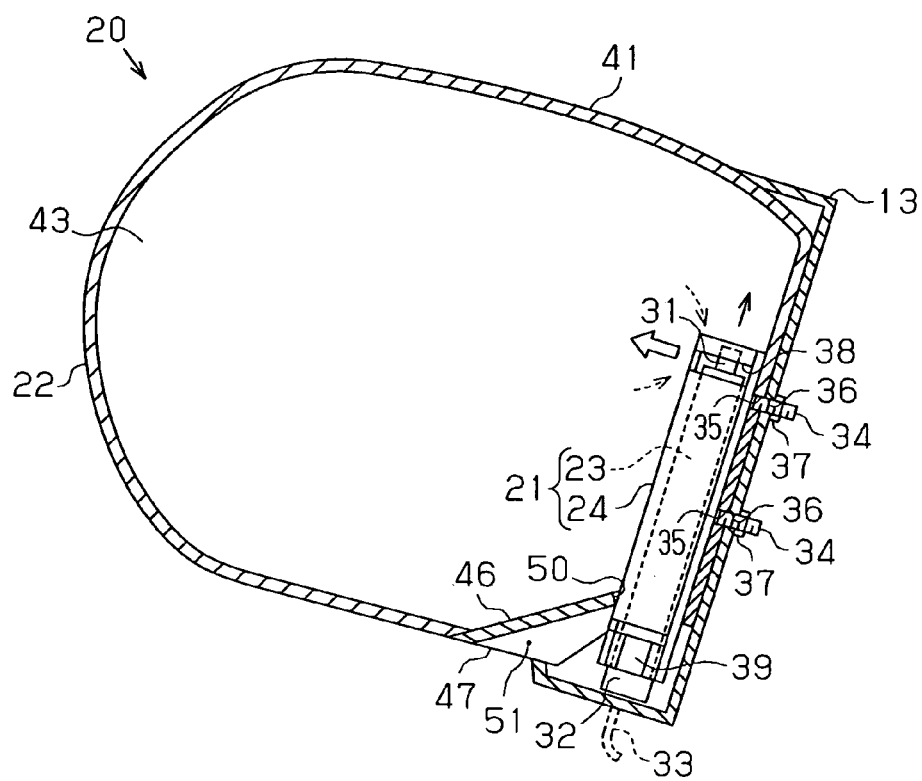
FIG. 3 is a cross-sectional view showing the side airbag apparatus.

As shown in FIGS. 2 and 3, the side airbag apparatus 20 includes a gas generator 21 for generating gas and an airbag 22. The airbag 22 is unfolded and inflated by the gas generated by the gas generator 21. The gas generator 21 includes a columnar inflator 23 from which the gas flows and a retainer 24 for securing the inflator 23 and the airbag 22 to the casing 13.

When an impact exceeding a predetermined level is applied to the side of the vehicle body, the inflator 23 of the side airbag apparatus 20 sends the gas to the airbag 22, thus unfolding and inflating the airbag 22. As viewed from the side, the airbag 22 has an oval shape. When inflated, the airbag 22, extending in the fore-and-aft direction of the vehicle, covers one side of the body of a passenger P, who is seated on the front seat 10, from shoulder to lower back. Normally, the airbag 22 is accommodated in the casing 13 in a state folded in a predetermined shape.

The inflator 23 is a cylinder type and has an outlet 31 defined in an upper end of the inflator 23. A connector 32 is provided in a lower end of the inflator 23. A non-illustrated gas generating agent for generating the gas is received in the inflator 23. The gas flows from the inflator 23 to the exterior through the outlet 31. A harness 33 extending from a non-illustrated control circuit is connected to the connector 32. A non-illustrated impact sensor for detecting an impact applied to the side of the vehicle body is electrically connected to the inflator 23 through the control circuit. The inflator 23 is arranged in the airbag 22 extending along a rear end of the airbag 22 as accommodated in the casing 13, with the connector 32 projecting outward from a lower portion of the airbag 22.

Figure 4:
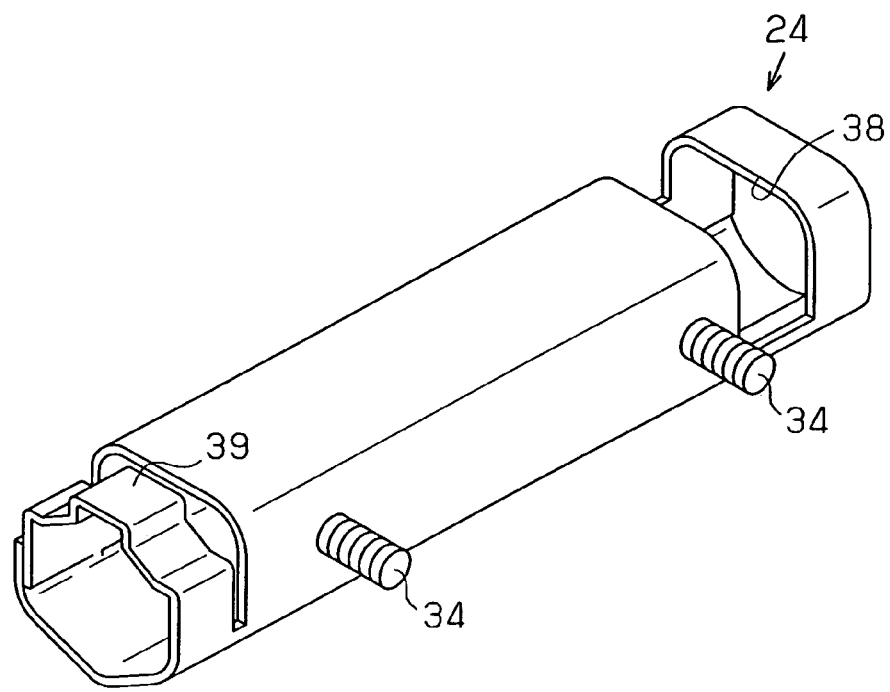
FIG. 4 is a perspective view showing a retainer.

As shown in FIGS. 3 and 4, the retainer 24 is formed of metal and has a polygonal shape. A pair of bolts 34 project from an upper portion and a lower portion of the retainer 24, rearward with respect to the vehicle. In correspondence with the bolts 34, a pair of attachment holes 35 are defined in the rear end of the airbag 22 and a pair of securing holes 36 are defined in the casing 13. After each of the bolts 34 is passed through the corresponding one of the attachment holes 35 and the associated securing hole 36, a nut 37 is fastened to the bolt 34. This secures the retainer 24 to an inner side of the casing 13. In this state, the airbag 22 is secured to the casing 13 and the retainer 24 extends along the rear end of the airbag 22 vertically, as received in the airbag 22.

The inflator 23 is accommodated in the retainer 24 and thus secured to the airbag 22 through the retainer 24. A gas port 38 is defined in the upper end of the retainer 24 in correspondence with the outlet 31 of the inflator 23. The gas port 38 causes the gas from the inflator 23 to flow mainly in a lateral direction of the inflator 23, with some of the gas proceeding upward from the inflator 23. A fixing piece 39 serving as a fixing portion is formed at the lower end of the retainer 24. The fixing piece 39 is swaged so that the diameter of the fixing piece 39 is reduced, in such a manner that the inflator 23 is fixed to the inner side of the retainer 24.

Figure 1A:
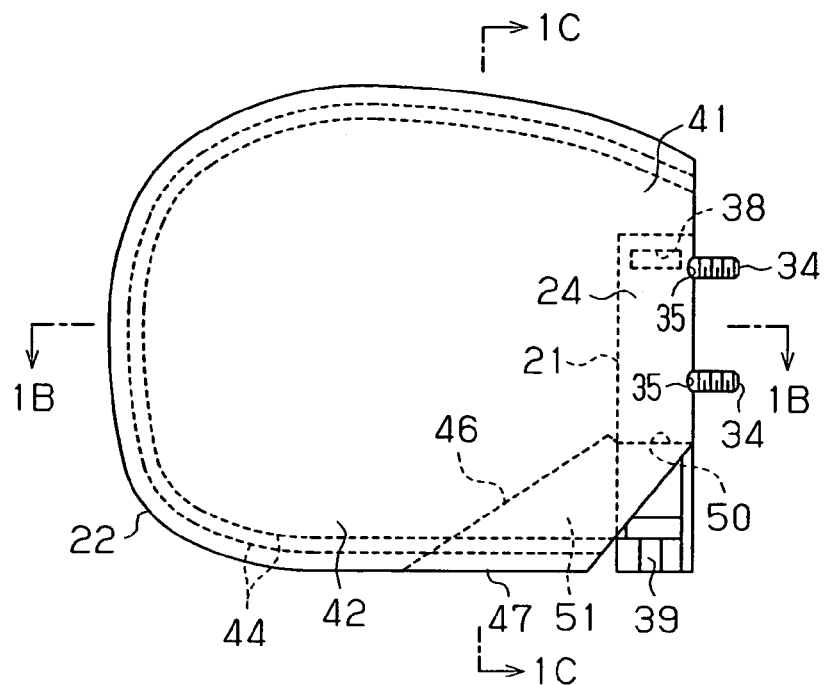
FIG. 1A is a side view showing an airbag according to a first embodiment of the present invention.
Figure 1B:
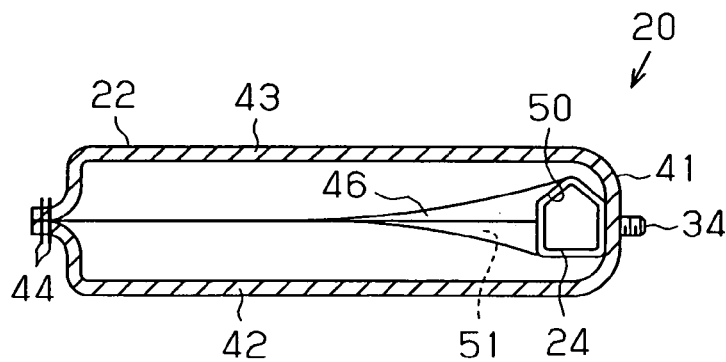
FIG. 1B is a cross-sectional view taken along line 1B-1B of FIG. 1A.
Figure 1C:
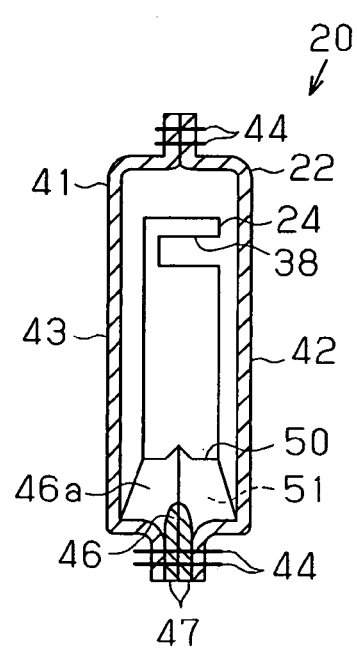
FIG. 1C is a cross-sectional view taken along line 1C-1C of FIG. 1A.

In FIG. 1A, the airbag 22 is unfolded without receiving the gas. In FIGS. 1B and 1C, the airbag 22 is unfolded and inflated by the gas. The airbag 22 is formed in a bag-like shape by folding a panel sheet 41 formed of woven textile or by a resin film in two and sewing the circumference of the sheet 41. Thus, a first surface section 42 defining one side of the airbag 22 and a second surface section 43 defining the opposed side are connected continuously with each other at the rear end of the airbag 22. The airbag 22 includes a seam 44 formed through sewing of the circumference of the airbag 22. The seam 44 thus extends along the circumference.

Figure 5:
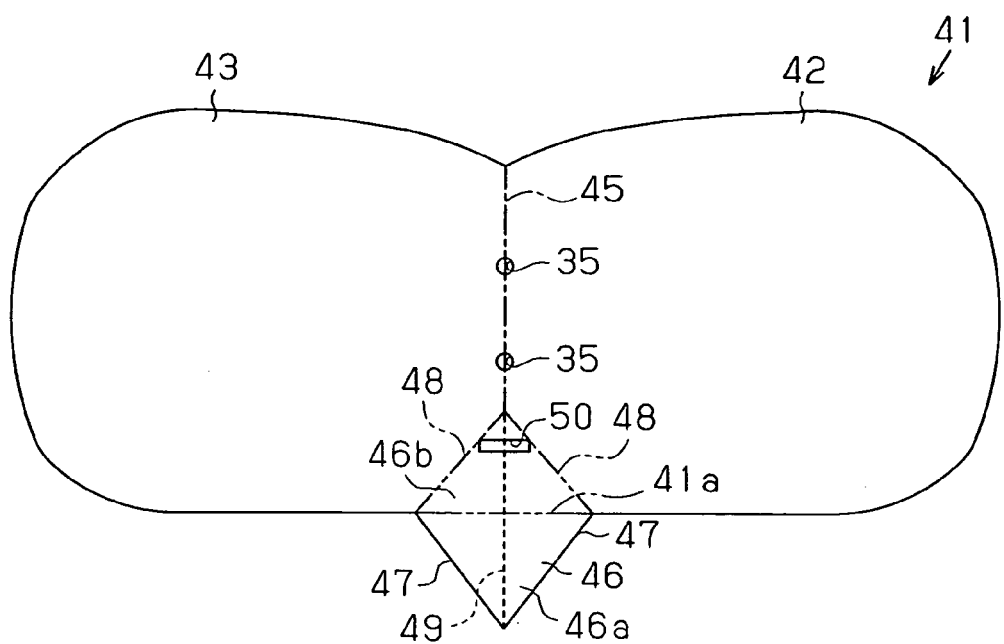
FIG. 5 is a side view showing a panel sheet in an unfolded state.

FIG. 5 shows the airbag 22 in an unfolded state, as viewed from inside. The panel sheet 41 includes the first surface section 42 and the second surface section 43, as well as a first folding line 45 defined between the first surface section 42 and the second surface section 43. Along the first folding line 45, the panel sheet 41 is folded in two. The attachment holes 35 are defined on the first folding line 45.

An inward folding portion 46 is defined in the panel sheet 41 and located at a position corresponding to the line extending from the first folding line 45 and in a circumferential portion of the panel sheet 41. The inward folding portion 46 includes a projection 46a and an inner portion 46b. The projection 46a projects from the panel sheet 41 to the exterior through an end 41a of the panel sheet 41, which is shown by the chain double-dashed line in FIG. 5. The projection 46a has a triangular shape. Opposing sides of the projection 46a have equal lengths. The inner portion 46b is located inward from the end 41a of the panel sheet 41 with respect to the panel sheet 41. The inner portion 46b and the projection 46a are mirror images in shape with respect to the end 41a of the panel sheet 41. Accordingly, the inward folding portion 46 as a whole is formed in a rhomboidal shape.

A second folding line 48 is defined between the inward folding portion 46 and the first and second surface sections 42, 43. The second folding line 48 defines the inward folding portion 46. The inward folding portion 46 further includes a third folding line 49 that is connected to the first folding line 45 and extends along the line extending from the first folding line 45. An insertion opening 50 is defined in the panel sheet 41 at a position corresponding to the third folding line 49, extending perpendicular to the third folding line 49. The retainer 24 is inserted into the airbag 22 through the insertion opening 50.

Figure 6:
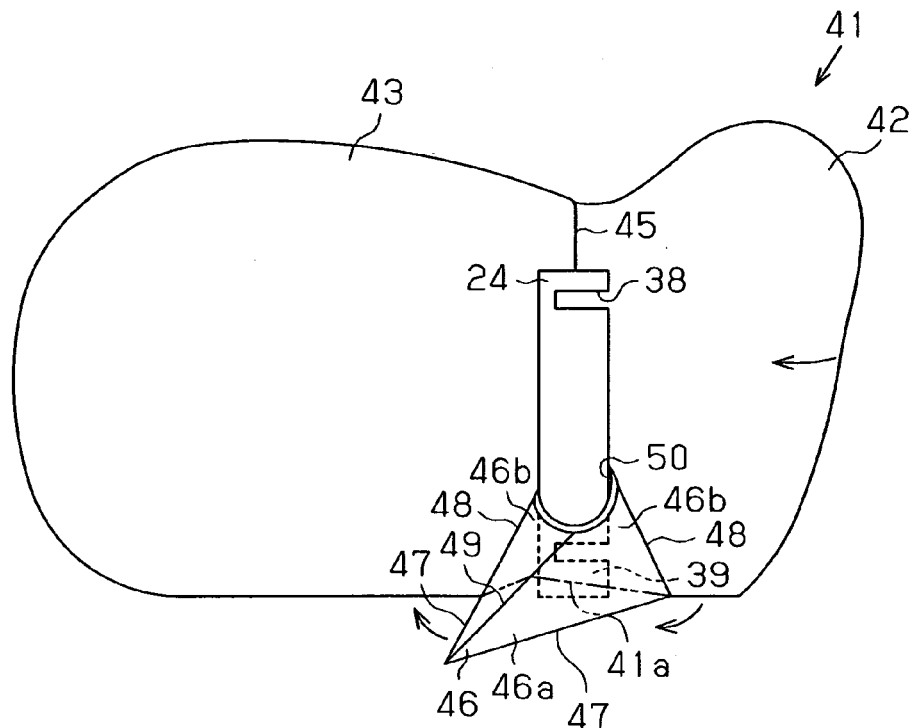
FIG. 6 is a side view illustrating the panel sheet in a folding step.

As illustrated in FIG. 6, a "valley fold" is formed in the panel sheet 41 along the first folding line 45. That is, the panel sheet 41 is folded up as viewed in FIG. 6 in two along the first folding line 45. The inward folding portion 46 is valley folded along the second folding line 48 and inwardly with respect to the airbag 22. A "mountain fold" is then formed in the inward folding portion 46 along the third folding line 49. That is, the inward folding portion 46 is folded away as viewed in FIG. 6 in two along the third folding line 49.

Figure 7A:
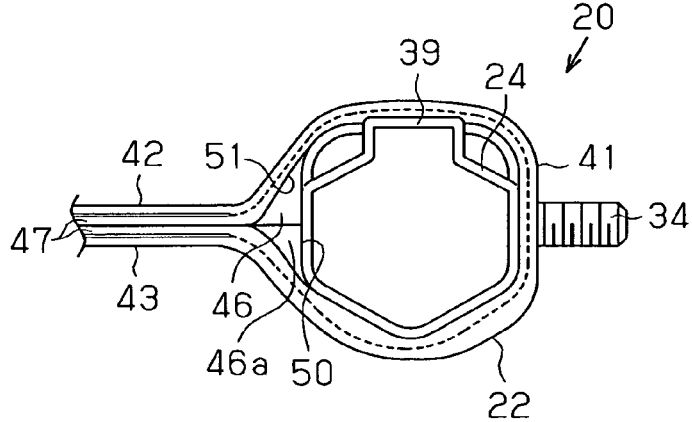
FIG. 7A is a bottom view showing a recess of the side airbag.
Figure 7B:
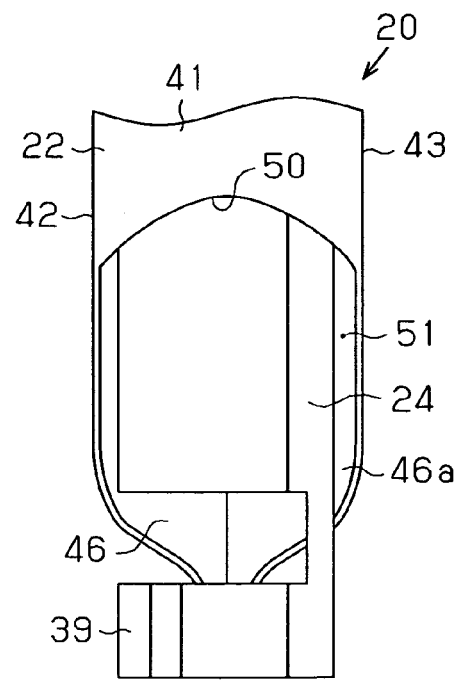
FIG. 7B is a rear view showing the recess of the side airbag.

Referring to FIGS. 1A, 1C, and 3, in the inward folding portion 46, which is folded inwardly with respect to the airbag 22, each of the sides 47 of the projection 46a corresponds to the circumference of the panel sheet 41, or the lower ends of the first and second surface sections 42, 43. The circumference of the projection 46a is sewn along the seam 44, together with the circumferences of the first and second surface sections 42, 43. As illustrated in FIGS. 7A and 7B, the circumference of the projection 46a is sewn in such a manner that the inward folding portion 46 is received in the airbag 22 without projecting outwardly. In this state, the inward folding portion 46 defines a recess 51 faced inwardly with respect to the airbag 22.

The insertion opening 50 communicates only with the recess 51. That is, the insertion opening 50 is shielded by the first and second surface sections 42, 43 and thus made invisible from the side of the airbag 22. Since the fixing piece 39 of the retainer 24 projects from the airbag 22 to the exterior through the insertion opening 50, the interior of the airbag 22 communicates with the exterior through the retainer 24.

An assembly procedure of the side airbag apparatus 20 will hereafter be explained. The procedure includes a step of fabricating the airbag 22, a step of securing the inflator 23 to the airbag 22, and a step of accommodating the airbag 22 with the inflator 23 into the casing 13. More specifically, the step of fabricating the airbag 22 includes a substep of attaching the retainer 24 to the panel sheet 41, a substep of folding the panel sheet 41, and a substep of completing the airbag 22 by sewing the panel sheet 41.

In the substep of attaching the retainer 24 to the panel sheet 41, the retainer 24 is inserted into the insertion opening 50 of the panel sheet 41, which is shown in FIG. 5. The bolts 34 of the retainer 24 are then passed through the attachment holes 35 of the panel sheet 41, thus temporarily securing the retainer 24 to the panel sheet 41. In this state, the fixing piece 39 of the retainer 24 projects from the airbag 22 to the exterior. For facilitating insertion of the retainer 24 into the insertion opening 50, it is preferable that the inner circumferential dimension of the insertion opening 50 be larger than the outer circumferential dimension of the retainer 24.

In the substep of folding the panel sheet 41, the panel sheet 41 is folded with the retainer 24 temporarily secured to the panel sheet 41, as illustrated in FIG. 6. The panel sheet 41 as a whole is valley folded in two along the first folding line 45. The inward folding portion 46 is valley folded along the second folding line 48 and then mountain folded along the third folding line 49. In this manner, the inward folding portion 46 is folded inwardly with respect to the airbag 22. In a state folded in two, the first and second surface sections 42, 43 of the panel sheet 41 overlap each other and the inward folding portion 46 folded in two is arranged between the first and second surface sections 42, 43. The sides 47 of the projection 46a correspond to the lower ends of the first and second surface sections 42, 43.

In the substep of sewing the airbag 22, the circumference of the panel sheet 41, which is folded in two, is sewn. Since the sides 47 of the projection 46a correspond to the lower ends of the first and second surface sections 42, 43, the circumference of the inward folding portion 46 is sewn, together with the circumference of the panel sheet 41. In this manner, referring to FIG. 1A, the airbag 22 is formed by the panel sheet 41 having the sewn circumference. Further, the inward folding portion 46 defines the recess 51, as illustrated in FIGS. 7A and 7B. In this state, the lower end and the fixing piece 39 of the retainer 24 project from the airbag 22 to the exterior.

In the step of securing the inflator 23 to the airbag 22, the inflator 23 is inserted into the retainer 24 from an opening defined at the lower end of the retainer 24. The fixing piece 39 is then swaged, thus fixing the inflator 23 to the retainer 24. The harness 33, for example, is connected to the connector 32 of the inflator 23.

In the step of accommodating the airbag 22 in the casing 13, the airbag 22 is folded in a predetermined shape and the bolts 34 of the retainer 24 are passed through the corresponding securing holes 36 of the casing 13. The nuts 37 are then fastened to the bolts 34, thus fixing the airbag 22 to the casing 13 through the retainer 24.

In the step of sewing the airbag 22, an end of the seam 44 is spaced from the outer circumferential surface of the retainer 24 at the sewn portion of the inward folding portion 46, with reference to FIG. 1C. This allows the panel sheet 41 to be sewn with the retainer 24 secured to the panel sheet 41, without being influenced by the size of the retainer 24. The circumference of the panel sheet 41 and that of the inward folding portion 46 are thus sewn while held in contact with each other.

As has been described, the interior of the airbag 22 communicates with the exterior only at the position corresponding to the insertion opening 50, after the sewing step is completed. Further, prior to the sewing step, the retainer 24 is passed through the insertion opening 50. The size of the insertion opening 50 is thus not adjusted through sewing and does not have to be larger than the size at which the retainer 24 can be passed through the opening 50. Further, the inflator 23 is secured to the airbag 22 simply by inserting the inflator 23 into the retainer 24 and fixing the inflator 23 to the retainer 24 by means of the fixing piece 39. Also, the lower end and the fixing piece 39 of the retainer 24 project from the airbag 22 to the exterior. Accordingly, the inflator 23 is secured to the airbag 22 without being affected by the size of the insertion opening 50. It is thus unnecessary to close the inward folding portion 46 and adjust the size of the insertion opening 50. As a result, after the side airbag apparatus 20 is installed, or following the sewing step in particular, the airbag 22 does not have to be subjected to the post treatment, such as closing, reducing the size of, or blocking the insertion opening 50.

The operation of the side airbag apparatus 20 is as follows. When an impact exceeding a predetermined level acts on a side of the vehicle body due to, for example, a car crash, a detection signal is sent from the impact sensor (not shown). In response to the signal, the control circuit (not shown) supplies a drive current to the inflator 23. The inflator 23 is thus heated by the drive current, causing the gas generating agent to generate gas. The gas is sent to the interior of the airbag 22 in the direction indicated by arrows in FIG. 3. In this manner, the airbag 22 is unfolded and inflated from a folded state.

Figure 8:
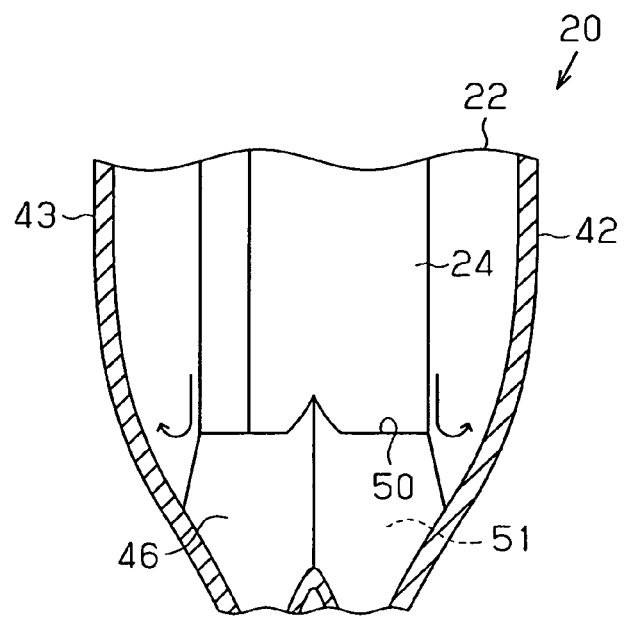
FIG. 8 is a cross-sectional view showing a main portion of the airbag.

At this stage, referring to FIG. 8, the portion corresponding to the recess 51 defined around the insertion opening 50 is pressed by the gas pressure outwardly with respect to the airbag 22. This portion, or the inward folding portion 46, is thus held in tight contact with the outer circumferential surface of the retainer 24. In this manner, the inward folding portion 46 functions as a check valve. The space defined by the insertion opening 50 and the outer circumferential surface of the retainer 24 is thus blocked. In this state, the insertion opening 50 is sealed by the airbag 22, suppressing gas leakage from the space defined by the insertion opening 50 and the outer circumferential surface of the retainer 24 after the airbag 22 is unfolded and inflated. As a result, the interior pressure of the airbag 22 is maintained at a relatively high level.

After a predetermined time elapses in this state, the pressure caused by the gas flowing from the inflator 23 is lowered. Therefore, the gas pressure in the retainer 24 becomes lower than the interior pressure of the airbag 22. This causes the gas to flow from the airbag 22 to the interior of the retainer 24. Since the interior of the airbag 22 communicates with the exterior through the retainer 24, the retainer functions as a vent hole. Te gas is thus discharged from the airbag 22 to the exterior through the retainer 24. In contrast, when the airbag 22 is in a state unfolded and inflated, the pressure caused by the gas provided from the inflator 23 is relatively high and the gas pressure in the retainer 24 is higher than the interior pressure of the airbag 22. This suppresses excessive gas leakage from the airbag 22 to the exterior through the retainer 24.

The first embodiment has the following advantages.

(1) The circumference of the inward folding portion 46 is sewn at the seam 44, together with the circumference of the panel sheet 41. The inward folding portion 46 thus defines the recess 51 faced inwardly with respect to the airbag 22. The insertion opening 50 through which the retainer 24 is inserted into the airbag 22 communicates only with the recess 51. Further, the insertion opening 50 is used only for arranging the retainer 24 in the airbag 22 and does not influence securing of the inflator 23 to the airbag 22. Therefore, after the circumference of the panel sheet 41 is sewn, the inward folding portion 46 and the insertion opening 50 do not have to be closed. It is thus unnecessary to perform the post treatment for the insertion opening 50.

(2) When the airbag 22 is unfolded and inflated, the portion corresponding to the recess 51 is pressed by the gas pressure outwardly with respect to the airbag 22. This causes the inward folding portion 46 to function as a check valve, thus suppressing gas leakage from the insertion opening 50 when the airbag 22 is unfolded and inflated. Accordingly, the interior pressure of the airbag 22 is maintained at a relatively high level.

(3) The lower end and the fixing piece 39 of the retainer 24 projects from the airbag 22 to the exterior. This makes it unnecessary for the operator to insert his or her hand into the airbag 22 when securing the inflator 23 to the retainer 24. Further, even after the airbag 22 is sewn, the inflator 23 may be secured to, or inserted into or fixed to, the retainer 24. The airbag apparatus 20 is thus fabricated with improved production efficiency.

(4) Since the interior of the airbag 22 communicates with the exterior through the retainer 24, which functions as a vent hole, the gas is allowed to flow from the airbag 22 to the exterior through the retainer 24 after the airbag 22 is unfolded and inflated. It is thus unnecessary to provide a separate vent hole in the airbag 22.

(5) Since the insertion opening 50 is defined on the third folding line 49, a portion of the insertion opening 50 corresponds to the bottom of the recess 51. The insertion opening 50 is thus made invisible from the side of the airbag 22 by a simple structure.

(6) Since the insertion opening 50 extends perpendicularly relative to the third folding line 49, the insertion opening 50 extends in directions in which the airbag 22 is inflated when the inward folding portion 46 is folded inwardly with respect to the airbag 22. This makes it easy to pass the retainer 24 through the insertion opening 50.

(7) The projection 46a makes it easy to overlap the circumference of the inward folding portion 46 with the circumference of the panel sheet 41. The circumference of the inward folding portion 46 and that of the panel sheet 41 are thus easily sewn together.

(8) The projection 46a has a triangular shape. Further, the inward folding portion 46 is folded in such a manner that the sides of the projection 46a correspond to the lower ends of the first and second surface sections 42, 43. The point of the projection 46a is thus located on the circumference of the panel sheet 41. This prevents the gap defined between the projection 46a and the inner portion 46b by folding the inward folding portion 46 in two from communicating with the interior of the airbag 22.

A second embodiment of the present invention will hereafter be described with reference to FIGS. 9 to 13B.

Figure 9:
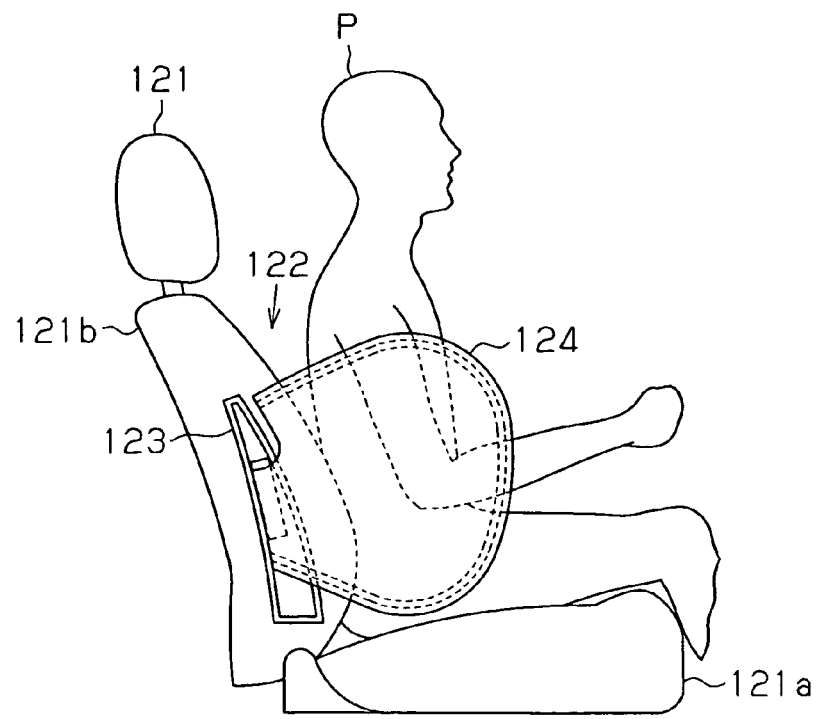
FIG. 9 is a side view showing a side airbag apparatus according to a second embodiment of the present invention.

FIG. 9 shows a right-side front seat 121 provided in a passenger compartment. The front seat 121 includes a seating portion 121a and a back 121b. A side airbag apparatus 122 is embedded in a right side portion of the back 121b, as received in a casing 123. The side airbag apparatus 122 is arranged to oppose to a non-illustrated door forming part of the side of the body of the vehicle. Although only the right-side front seat 121 is shown in the drawing, a left-side front seat is also provided and an apparatus identical with the side airbag apparatus 122 is installed in the back of the left-side front seat. In FIG. 9, an airbag 124 of the side airbag apparatus 122 is shown in an unfolded state. When unfolded and inflated, the airbag 124 extends into the gap between the side of the vehicle body and the passenger P seated on the front seat 121.

Figure 10:
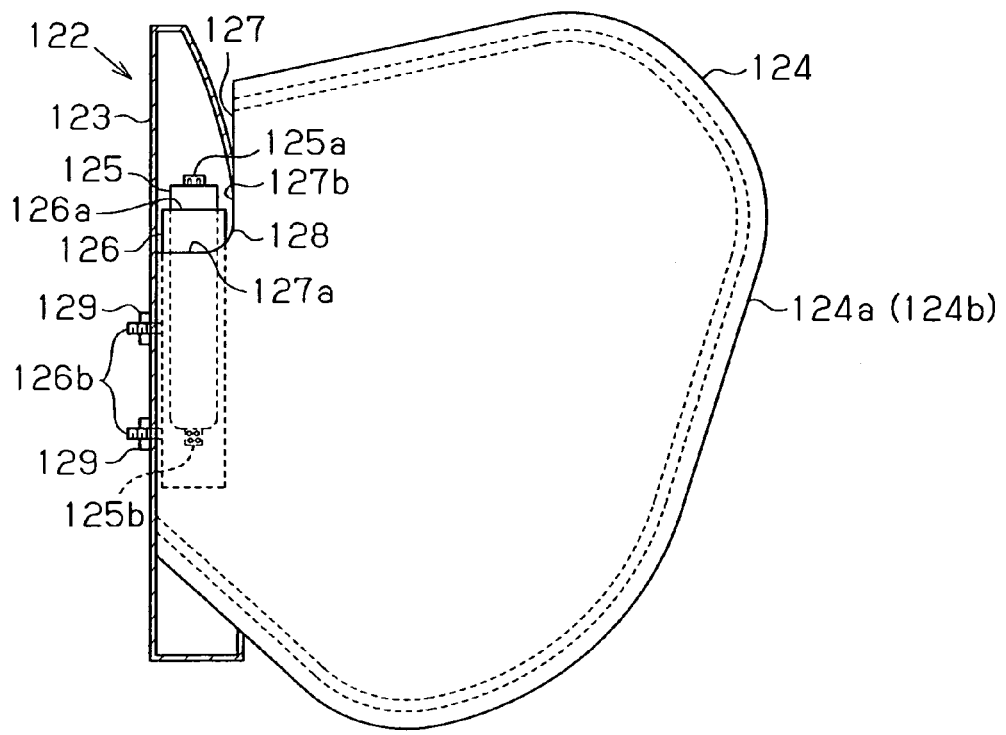
FIG. 10 is a cross-sectional view showing a portion of the side airbag apparatus.

As shown in FIG. 10, the side airbag apparatus 122 includes the airbag 124 unfolded and inflated when supplied with gas, an inflator 125 for generating the gas, and a retainer 126. The side airbag apparatus 122 is fixed to a casing 123, which serves as an accommodating portion provided in the passenger compartment, through the retainer 126.

The airbag 124 includes a first textile portion 124a and a second textile portion 124b. When the airbag 124 is inflated, the first and second textile portions 124a, 124b define opposing side sections of the airbag 124. The textile portions are formed of, for example, woven textile, and are connected continuously with each other at a proximal end (rear end) of the airbag 124. The airbag 124 is formed in a bag-like shape by sewing the circumferences of the first and second textile portions 124a, 124b together. An insertion opening 127 is defined above the proximal end (rearward with respect to the vehicle) and has an L shape as viewed from the side of the airbag 124. The insertion opening 127 corresponds to a non-sewn portion of the first and second textile portions 124a, 124b provided above the proximal end of the airbag 124. The insertion opening 127 has an upper opening portion 127a facing upward from the airbag 124 and a proximal opening portion 127b facing in the direction in which the proximal end of the airbag 124 is facing. The upper and proximal opening portions 127a, 127b are defined continuously with each other.

Figure 11:
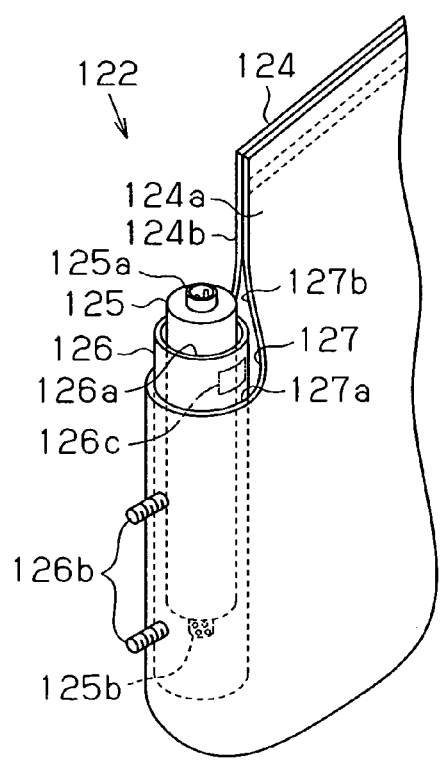
FIG. 11 is a perspective view showing a portion of the side airbag apparatus.

As illustrated in FIG. 11, the first and second textile portions 124a, 124b separate from each other at the position corresponding to the insertion opening 127. This allows the retainer 126 to be inserted into the airbag 124 through the insertion opening 127. Referring to FIG. 10, an opening end portion extending from the upper opening portion 127a to the proximal opening portion 127b is shaped in a curved manner. The opening end of the insertion opening 127 thus includes a curved portion 128.

As shown in FIG. 11, the inflator 125 is a cylinder type and includes a connector 125a formed at an end of the inflator 125. An outlet 125b is formed at an end of the inflator 125 opposed to the connector 125a. A non-illustrated gas generating agent is received in the inflator 125. When heated by a drive current supplied from the connector 125a, the gas generating agent generates gas, which flows from the outlet 125b.

The retainer 126 is made of metal and formed as a cylindrical body. Also, the retainer 126 is inserted into the airbag 124 through the insertion opening 127 in such a manner that the retainer 126 is arranged at the proximal end of the airbag 124. The retainer 126 extends vertically and has an opening 126a defined at an upper portion of the retainer 126. The inflator 125 is inserted into the retainer 126 through the opening 126a. The retainer 126 is arranged in the airbag 124 with the end corresponding to the opening 126a projecting to the exterior. A pair of upper and lower bolts 126b project from the retainer 126 rearward with respect to the vehicle. Each of the bolts 126b is passed through a corresponding one of holes that are defined on the midline of the proximal end of the airbag 124 and extend through the casing 123. As shown in FIG. 10, the airbag apparatus 122 is fixed to the casing 123 by fastening nuts 129 to the bolts 126b.

As illustrated in FIG. 11, the inflator 125 is inserted into the retainer 126 from the opening 126a and extends vertically, with the connector 125a arranged above the airbag 124 and the outlet 125b located in a lower portion of the airbag 124. The connector 125a projects outwardly from the airbag 124 through the opening 126a. A harness connector (not shown) is connected to the connector 125a and thus an impact sensor is electrically connected to the inflator 125 through a control circuit. The outlet 125b is provided in a lower portion of the retainer 126, or received in the airbag 124, for supplying gas to the interior of the airbag 124. The retainer 126 is swaged at a fixing portion 126c, which is indicated by chain double-dashed lines in FIG. 11, in such a manner as to reduce the diameter of the retainer 126. The inflator 125 is thus fixed to the inner side of the retainer 126. The fixing portion 126c is exposed to the exterior of the airbag 124 from the insertion opening 127. This arrangement allows the inflator 125 to be fixed to the inner side of the retainer 126 even after the retainer 126 is accommodated in the airbag 124.

A folding method for the airbag 124 of the side airbag apparatus 122 will now be described. In a first step of the method, the airbag 122, which is formed flat and has the insertion opening 127, is prepared. In a subsequent step, the retainer 126 is passed through the insertion opening 127 in such a manner that a portion of the retainer 126 projects from the insertion opening 127 and the retainer 126 is held in contact with the opening end of the insertion opening 127, thus defining a contact point p1, with reference to FIGS. 12A and 12B. This step is followed by a first folding step and a second folding step. More specifically, in the first folding step, a folding line 130 is defined starting from the contact point p1 and the airbag 122 is folded along the folding line 130. In the second folding step, the airbag 122 in the folded state is further folded in a pleated manner from the distal end of the airbag 124 to the side corresponding to the retainer 126.

Figures 12A, 12B:
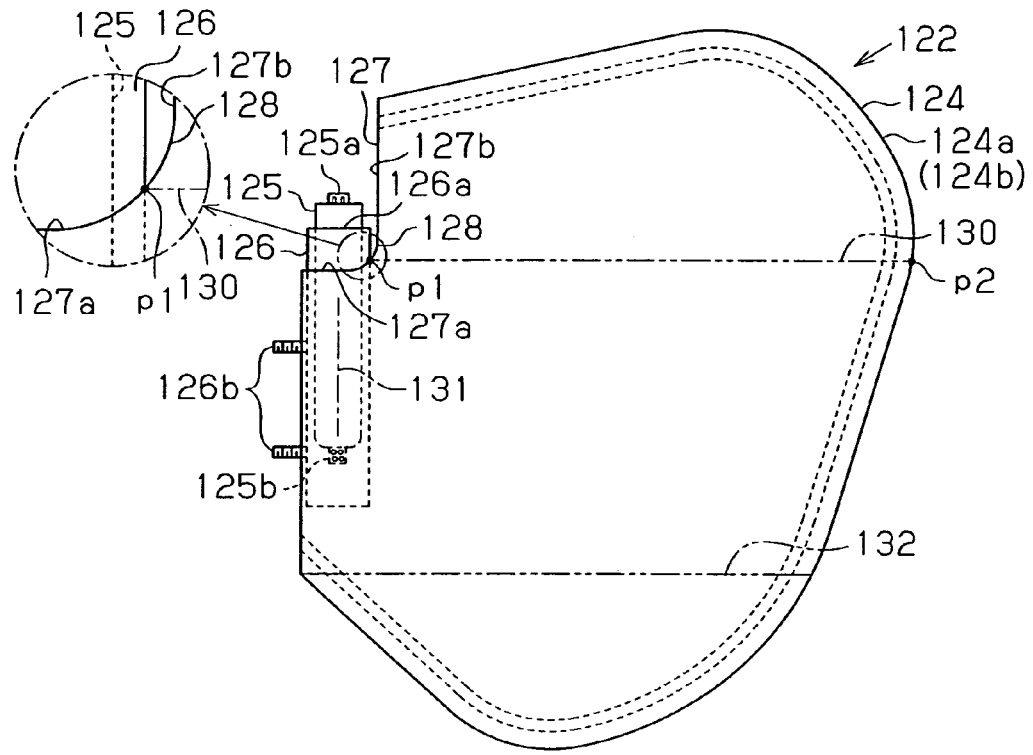
FIG. 12A is a side view showing a side airbag apparatus.
FIG. 12B is a side view showing a main portion of a side airbag.

As illustrated in FIGS. 12A and 12B, the folding line 130, which is defined in the first folding step, extends from the insertion opening 127 to the distal end of the airbag 124. In this step, an upper section of the airbag 124 is folded along the folding line 130 in such a manner as to overlap a lower part of the airbag 124. This fastens the retainer 126 to the end of the insertion opening 127. The contact point p1 is set in the curved portion 128 of the insertion opening 127. This makes it easy for the retainer 126 to effectively receive the fastening force applied by the first and second textile portions 124a, 124b to the retainer 126, when the upper section of the airbag 124 is folded over the lower part of the airbag 124. The folding line 130 extends perpendicularly to an axis 131 of the inflator 125, linearly from the contact point p1 to the distal end of the airbag 124. The folding line 130 ends at an intersecting point p2 between the circumference of the distal end of the airbag 124 and the folding line 130. Prior to the first folding step, a lower section of the airbag 124 is folded upwardly along a lower folding line 132 extending from the proximal end of the airbag 124 to the distal end of the airbag 124.

Figures 13A, 13B:
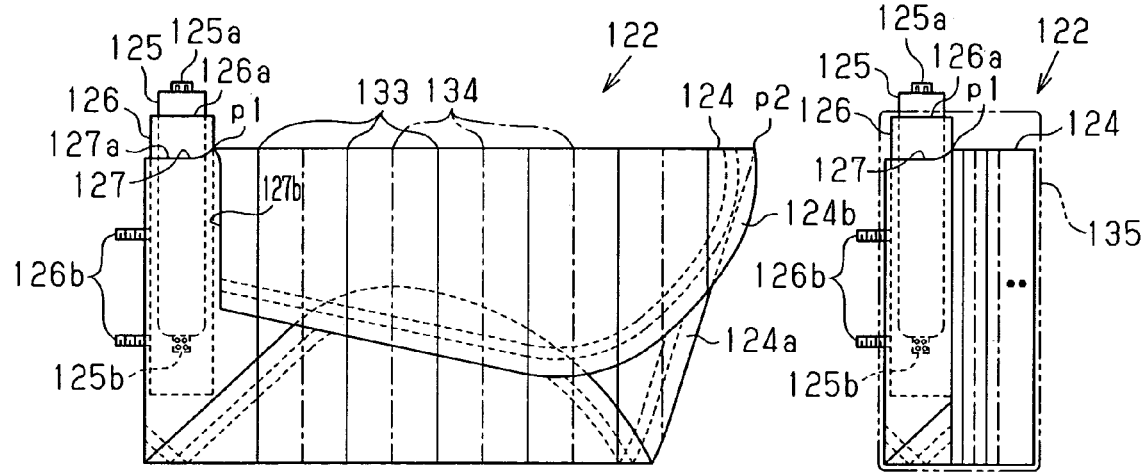
FIG. 13A is a side view showing the side airbag apparatus after a first folding step.
FIG. 13B is a side view showing the side airbag apparatus after a second folding step.

As illustrated in FIG. 13A, in the second folding step, the airbag 124 is folded in a pleated manner along a plurality of mountain fold lines 133 and valley fold lines 134, each extending linearly and vertically. More specifically, folding of the airbag 124 is started from the distal end of the airbag 124 and continues toward the retainer 126 (the proximal end of the airbag 124). Thus, when the gas is supplied to the proximal end of the airbag 124, the airbag 124 is unfolded and inflated from the proximal end of the airbag 124 (rearward with respect to the vehicle) toward the distal end of the airbag 124 (forward with respect to the vehicle). Referring to FIG. 13B, when the second folding step is completed, the airbag 124 is held in a retracted state with respect to the proximal end of the airbag 124 (the retainer 126). The airbag 124 is maintained in this state as covered by a cover 135, as indicated by the chain double-dashed lines in FIG. 13B. The airbag 124 is then installed in the side airbag apparatus 122, which is accommodated in a casing 123 of the back 121b, as shown FIG. 9.

The operation of the side airbag apparatus 122 will hereafter be explained. If an impact exceeding a predetermined level is applied to the side of the vehicle body due to, for example, a car crash, the impact sensor (not shown) generates a detection signal. In response to the signal, the control circuit (not shown) supplies a drive current to the inflator 125. The inflator 125 is thus heated by the drive current and causes the gas generating agent to generate gas. The gas then flows from the outlet 125b and produces the pressure that acts to unfold and inflate the airbag 124 from the retracted state of FIG. 13B to the unfolded state of FIG. 13A, in which the mountain fold lines 133 and the valley fold lines 134 are exposed (an initial stage of unfolding and inflation). At this stage, the airbag 124 is maintained in the state folded along the folding lines 130, 132. The insertion opening 127 is thus sealed by the airbag 124 and the retainer 126. In this manner, gas leakage from the insertion opening 127 is suppressed when the airbag 124 is unfolded from the retracted state of FIG. 13B to the state of FIG. 13A corresponding to the initial stage of unfolding and inflation.

When the interior pressure of the airbag 124 is further raised, the airbag 124 is inflated from the state of FIG. 13A corresponding to the initial stage of unfolding and inflation to the state of FIGS. 12A and 12B in which the folding line 130 is exposed (a later stage of unfolding and inflation). At this stage, the insertion opening 127 is released from the state sealed by the airbag 124 and the retainer 126. Some of the gas is thus allowed to escape from the insertion opening 127, suppressing an excessive pressure rise in the airbag 124.

The second embodiment has the following advantages.

(9) In the second embodiment, the folding method of the airbag 124 includes the step of preparing the airbag 122, the step of defining the contact point p1, the first folding step, and the second folding step. The folding line 130 used in the first folding step starts from the contact point p1. After the first folding step, the airbag 124 is folded in the pleated manner from the distal end of the airbag 124 to the end corresponding to the retainer 126. The airbag 124 is maintained in this state. Therefore, in accordance with the method of the second embodiment, the airbag 124 is folded with the retainer 126 fastened by the ends of the first and second textile portions 124a, 124b corresponding to the insertion opening 127. Therefore, even if the insertion opening 127 is sized sufficiently large with respect to the outer diameter of the retainer 126, the airbag 124 may be folded in such a manner as to seal the insertion opening 127 in the first folding step. Further, when the airbag 124 is maintained in the state resulting from the second folding step, the insertion opening 127 is maintained in a sealed state. Accordingly, when the airbag 124 is unfolded and inflated, at the initial stage of unfolding and inflation in particular, gas leakage from the insertion opening 127 is suppressed. The interior pressure of the airbag 124 is thus prevented from dropping, and unfolding and inflation of the airbag 124 are easily controlled.

Also, at the later stage of unfolding and inflation, the insertion opening 127 is released from the fastened state and thus allows some of the gas to escape from the airbag 124 to the exterior through the insertion opening 127. In other words, the insertion opening 127 functions as a discharge port (a vent hole). This suppresses an excessive pressure rise in the airbag 122 when the airbag 124 is completely unfolded and inflated, thus reliably protecting the passenger P. Further, since the insertion opening 127 functions as the discharge port, it is unnecessary to provide a separate discharge port in the airbag 124. The configuration of the airbag 124 is thus simplified, making it easy to fabricate the side airbag apparatus 122.

(10) In the method of the second embodiment, the curved portion 128 is provided along the end of the insertion opening 127 and the contact point p1 is defined on the curved portion 128. Therefore, when the airbag 124 is folded along the folding line 130, the fastening force applied to the retainer 126 is effectively received by the retainer 126 through the end of the insertion opening 127. The insertion opening 127 is thus further easily sealed, and gas leakage from the insertion opening 127 at the initial stage of unfolding and inflation is further effectively suppressed.

(11) The folding line 130 extends linearly and perpendicularly to the axis 131 of the cylinder type inflator 125. Therefore, when the airbag 124 is folded in the second folding step, such folding is performed along the folding line 130 from the distal end of the airbag 124 toward the retainer 126, thus facilitating the folding. Further, the mountain fold lines 133 and the valley fold lines 134 of the second folding step extend perpendicularly to the folding line 130 of the first folding step. The airbag 124 is thus easily folded in a pleated manner along the mountain fold lines 133 and the valley fold lines 134.

(12) The insertion opening 127 is defined in the upper section of the airbag 124 corresponding to an upper portion of the passenger compartment. The upper section of the airbag 124 is folded in the first folding step in such a manner as to shorten the vertical dimension of the airbag 124, allowing the side airbag apparatus 122 to be compactly received in the casing 123. Further, at the initial stage of unfolding and inflation at which the airbag 124 is unfolded along the folding lines corresponding to the second folding step, the airbag 124 is unfolded and inflated while maintaining the shortened vertical dimension of the airbag 124.

(13) In the second folding step, the airbag 124 is folded in a pleated manner from the distal end of the airbag 124 toward the retainer 126. This allows the airbag 124 to be rapidly unfolded and inflated at the initial stage of unfolding and inflation at which the airbag 124 is unfolded along the folding lines corresponding to the second folding step. Further, the portion of the airbag 124 corresponding to the contact point p1, which is used in the first folding step, is pressed by the outer sides of the airbag 124 folded in the pleated manner. Accordingly, gas leakage from the insertion opening 127 at the initial stage of unfolding and inflation is further effectively suppressed.

(14) The retainer 126 is formed of metal and received in the airbag 124 with the end of the retainer 126 corresponding to the opening 126a projecting from the airbag 124 to the exterior through the insertion opening 127. The inflator 125 is fixed to the inner side of the retainer 126 by swaging the retainer 126 at the fixing portion 126c. The fixing portion 126c of the retainer 126 is exposed from the insertion opening 127 to the exterior of the airbag 124. Therefore, as long as the retainer 126 is fixed to the airbag 124, the inflator 125 is easily fixed to the retainer 126 even after the second folding step is completed, by inserting the inflator 125 into the retainer 126 and swaging the fixing portion 126c. Accordingly, the precedent steps of the method can be executed without involving the inflator 125, which is relatively difficult to handle, thus facilitating fabrication of the side airbag apparatus 122.

(15) Since the connector 125a projects from the opening 126a to the exterior of the airbag 124, the harness connector is easily connected to the connector 125a. This makes it easy to install the side airbag apparatus 122 in the vehicle.

The illustrated embodiments may be modified as follows.

With reference to FIGS. 14A and 14B, the projection 46a may be omitted from the side airbag apparatus 20 of the first embodiment. The inward folding portion 46 is thus formed only by the inner portion 46b. In this case, the space defined by the inner portion 46b resulting from folding of the inward folding portion 46 in two sections communicates with the interior of the airbag 22. It is thus preferable that the seam 44 be formed in a shape corresponding substantially to the letter "G" as viewed from the side of the airbag 22. Alternatively, the insertion opening 50 may be omitted and replaced by a space 52 serving as an insertion opening.

The shape of the projection 46a of the first embodiment is not restricted to a triangular shape but may be a square, oval, or strip-like shape.

Figure 16:
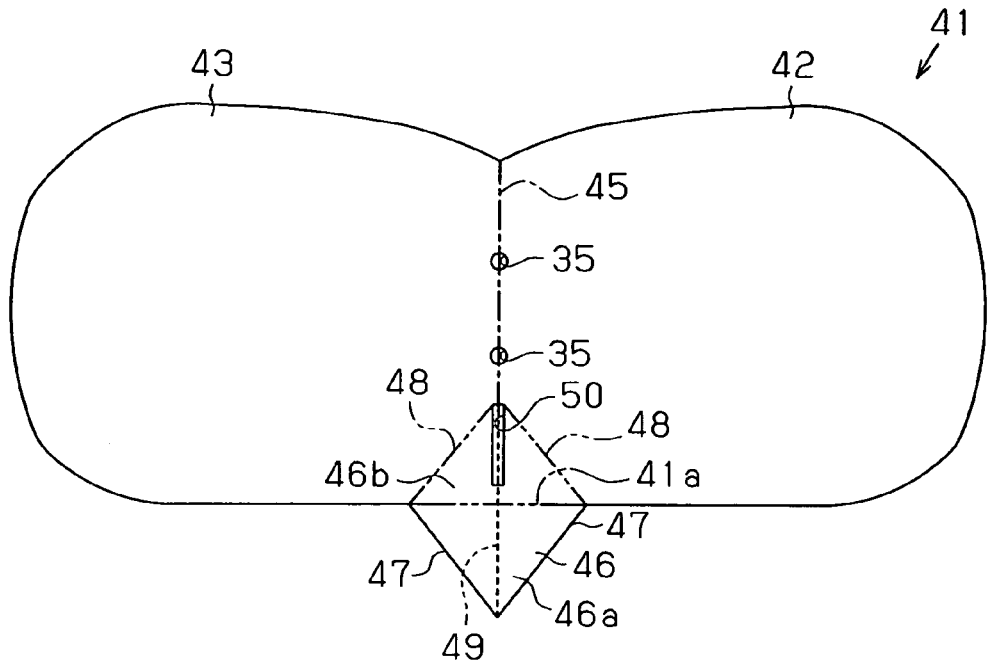
FIG. 16 is a side view corresponding to FIG. 5, showing a panel sheet of the second modification in an unfolded state.

As illustrated in FIGS. 15 and 16, the insertion opening 50 of the first embodiment may be defined in such a manner as to extend along the third folding line 49. In this case, the insertion opening 50 is extended in a direction in which the inward folding portion 46 is folded. The end of the insertion opening 50 thus fastens the retainer 24, suppressing gas leakage from the insertion opening 50 further effectively. Alternatively, the insertion opening 50 may extend in a direction intersecting the third folding line 49, other than the directions perpendicular to or along the third folding line 49. Also, the shape of the insertion opening 50 does not necessarily have to be an elongated shape but may be a cross, circular, oval, or polygonal shape. In FIGS. 14A and 14B, the insertion opening 50 is formed by an elongated opening extending along the third folding line 49. However, the insertion opening 50 of the drawings may extend in a direction perpendicular to or intersecting the third folding line 49 and have a cross, circular, oval, or polygonal shape.

In the first embodiment, the retainer 24 is temporarily fixed to the panel sheet 41 before the panel sheet 41 is sewn. However, the retainer 24 may be temporarily fixed to the panel sheet 41 after the panel sheet 41 is completely sewn.

In the first embodiment, a separate vent hole may be provided in the airbag 22 for escaping the gas from the vent hole.

In the first embodiment, the retainer 24 may be entirely received in the airbag 22. Alternatively, the retainer 24 may be arranged in such a manner that the lower end and the fixing piece 39 of the retainer 24 are received in the recess 51.

Figures 17A, 17B:
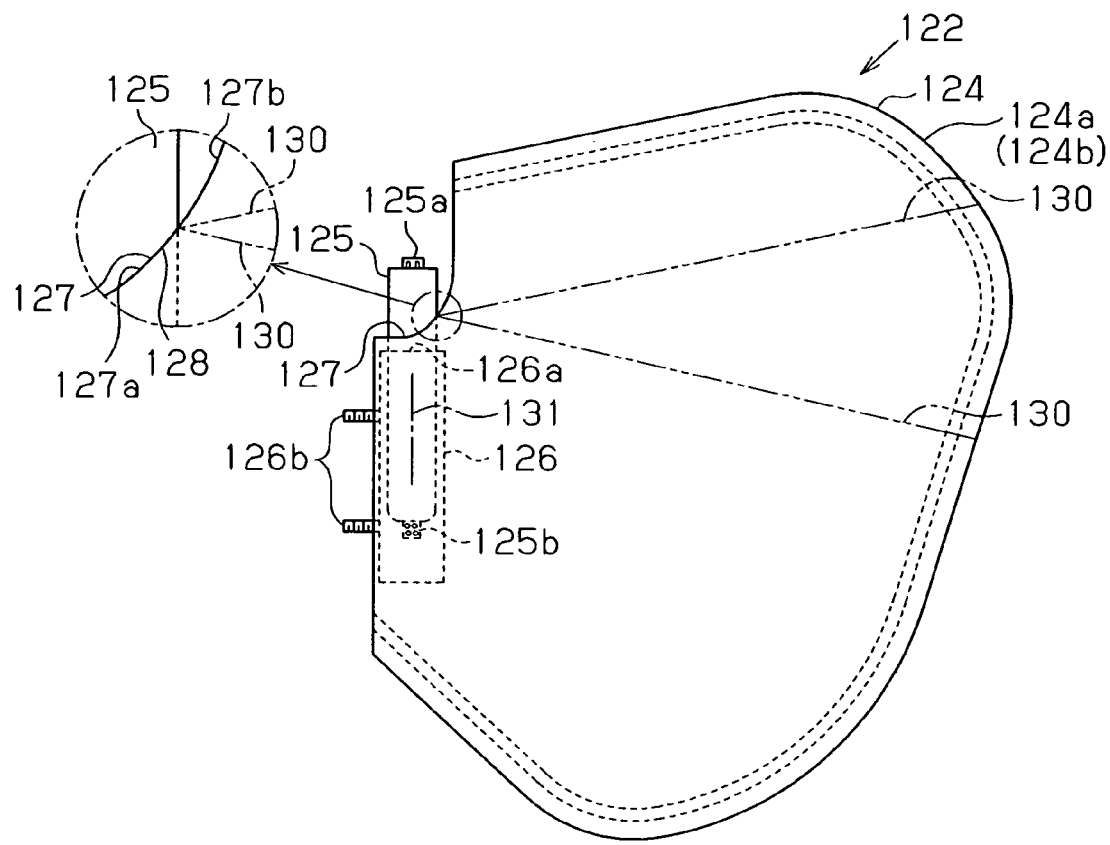
FIG. 17A is a side view corresponding to FIG. 12A, showing an airbag of a third modification.
FIG. 17B is a side view corresponding to FIG. 12B, showing a main portion of the airbag of the third modification.

As shown in FIGS. 17A and 17B, the inflator 125 may be provided with a portion of the inflator 125 of the second embodiment projecting from the insertion opening 127 to the exterior of the airbag 124. The folding line 130 starts at the contact point p1 between the inflator 125 and the end of the insertion opening 127. In this case, the airbag 124 is folded in such a manner that the inflator 125 is fastened by the ends of the first and second textile portions 124a, 124b corresponding to the insertion opening 127, thus sealing the insertion opening 127. This suppresses a pressure drop in the airbag 124, and unfolding and inflation of the airbag 124 is easily controlled.

Referring to FIGS. 17A and 17B, the folding line 130 of the second embodiment may extend in a different manner other than extending perpendicularly to the axis 131 of the inflator 125.

With reference to FIGS. 18A and 18B, the end of the insertion opening 127 may be defined without the curved portion 128, unlike the second embodiment. In this case, the contact point p1 is set on a straight line including the end of the insertion opening 127.

In the second embodiment, the proximal opening portion 127b may be omitted. That is, the airbag 124 may be sewn from the distal end of the upper opening portion 127a to the upper end of the airbag 124.

As shown in FIG. 19A, when the airbag 124 is folded along the folding line 130 in the second embodiment, the folded portion may be received in the space between the inner sides of the airbag 124, or the first and second textile portions 124a, 124b.

In the second embodiment, the insertion opening 127 may be provided in the lower section of the airbag 124 corresponding to a lower portion of the passenger compartment. In this case, the lower portion of the airbag 124 is folded along a folding line in the first folding step, allowing the airbag apparatus 122 to be accommodated compactly in the casing 123. Further, at the initial stage of unfolding and inflation in which the airbag 124 is unfolded along the folding lines corresponding to the second folding step, the airbag 124 is unfolded and inflated while maintaining a shortened vertical dimension.

In the second embodiment, the inflator 125 may be provided in the retainer 126 without projecting from the opening 126a to the exterior of the airbag 124.

In the second folding step of the second embodiment, the airbag 124 may be folded in a rolled shape from the distal end of the airbag 124 toward the retainer 126.

In the second embodiment, folding of the airbag 124 along the lower folding line 132 may be omitted.

As shown in FIG. 19B, the airbag apparatus 122 of the second embodiment may include an accommodation container 136 for accommodating the airbag 124 in a folded state and the retainer 126. The insertion opening 127 may be provided in such a manner that the insertion opening 127 is located in the accommodation container 136 when the airbag 124 is unfolded and inflated. In this case, the insertion opening 127 is blocked by the accommodation container 136 when the airbag 124 is unfolded and inflated, thus allowing the gas to slowly escape from the insertion opening 127. This appropriately adjusts the interior pressure of the airbag 124 when the airbag 124 is unfolded and inflated. The accommodation container 136 may be formed of, for example, metal or resin.

In the second embodiment, the first and second textile portions 124a, 124b may be formed as separate bodies. Alternatively, each of the first and second textile portions 124a, 124b may be formed by connecting a plurality of textile portions.

In the first embodiment, the fixing portion provided in the retainer 24 is not restricted to the fixing piece 39 but may be, for example, a spring, as long as the inflator 23 is reliably fixed. Further, in the second embodiment, a through hole may extend through the fixing portion 126c and a fastener such as a spring may be passed through the through hole for fixing the inflator 125 to the retainer 126.

In the second embodiment, the side airbag apparatus 122 may be provided between a rear seat and a corresponding side of the vehicle body. In this case, the airbag 124 extends into the gap between a passenger seated on the rear seat and the side of the vehicle body, when unfolded and inflated.

In the first embodiment, the airbag apparatus may be embodied as, for example, a knee airbag apparatus in which an airbag is unfolded and inflated in the vicinity of the passenger's foot or a side airbag apparatus for a rear seat in which an airbag is unfolded and inflated beside a passenger seated on a rear seat. Further, in the second embodiment, the airbag apparatus may be embodied as, for example, a rear airbag apparatus. The rear airbag apparatus is installed in a front seat of a vehicle having the front seat and a rear seat, thus allowing the airbag 124 to unfold and inflate in such a manner as to proceed into the gap between the front seat and the rear seat. In this manner, the airbag 124 protects, for example, the legs of the passenger seated on the rear seat.

The present examples and embodiments are to be considered as illustrative and not restrictive and the invention is not to be limited to the details given herein, but may be modified within the scope and equivalence of the appended claims.

The invention claimed is:

1. An airbag apparatus comprising;
a gas generator for generating gas; and
an airbag which is unfolded and inflated by the gas when the gas generator is operated,
wherein the airbag includes an insertion opening through which the gas generator is inserted into the airbag, a panel sheet and a recess defined inwardly with respect to the airbag, the airbag formed by folding the panel sheet in two and sewing the circumference of the panel sheet,
wherein the panel sheet has a first folding line for folding the panel sheet in two and an inward folding portion including a line extending from the first folding line and arranged in a circumferential portion of the panel sheet,
wherein the inward folding portion has a second folding line by which the inward folding portion is defined and a third folding line that extends along the line extending from the first folding line,
wherein the recess is provided by folding the inward folding portion alone the second folding line inwardly with respect to the airbag, folding the inward folding portion in two along the third folding line, and sewing the circumference of the inward folding portion together with the circumference of the panel sheet, a
wherein the insertion opening is arranged in and sealed by the inward folding portion, wherein the gas generator includes a portion projecting from the airbag to the exterior through the insertion opening, and wherein the insertion opening is sealed by the inward folding portion and the projecting portion of the gas generator.

2. The apparatus according to claim 1, wherein the gas generator includes an inflator for supplying the gas into the airbag and a retainer secured to the airbag for securing the inflator to the airbag, and wherein the retainer includes a fixing portion for fixing the inflator and is secured to the airbag with the fixing portion projecting from the airbag to the exterior through the insertion opening.

3. The apparatus according to claim 2, wherein the retainer is shaped like a cylinder, and wherein the interior of the airbag communicates with the exterior through the retainer.

4. The apparatus according to claim 1, wherein the insertion opening extends in a direction intersecting the third folding line or a direction in which the third folding line extends.

5. The apparatus according to claim 1, wherein the inward folding portion includes:

a projection projecting from an end of the panel sheet to the exterior of the panel sheet; and an inner portion arranged inwardly with respect to the panel sheet as compared to the end of the panel sheet.

6. The apparatus according to claim 5, wherein the projection is formed in a triangular shape, and wherein the inward folding portion is folded in such a manner that the circumference of the projection overlaps the circumference of the panel sheet.

7. An airbag apparatus comprising:

a gas generator for generating gas; and an airbag which is unfolded and inflated by the gas when the gas generator is operated, wherein the apparatus is used by being fixed to an accommodating portion provided in a passenger compartment of a vehicle, wherein the gas generator includes an inflator for generating the gas and a retainer fixed to the accommodating portion for receiving the inflator, wherein the airbag has an insertion opening defined in a proximal end of the airbag through which the retainer is passed and a contact point at which one of the retainer and the inflator is held in contact with the circumference of an opening end of the insertion opening, and wherein the retainer and inflator are arranged in the proximal end of the airbag with a portion of one of the retainer and inflator projecting from the airbag to the exterior through the insertion opening, and wherein the insertion opening is sealed by the projecting portion of one of the retainer and inflator and by folding the air bag along a folding line starting from the contact point and re-folding the airbag from the distal end of the airbag to the proximal end.

8. The apparatus according to claim 7, wherein the retainer includes a fixing portion for fixing the inflator arranged at a position outwardly from the insertion opening with respect to the airbag, the retainer being formed of metal and received in the airbag with an opening of the retainer located outwardly from the insertion opening with respect to the airbag, and wherein the inflator is fixed to the retainer by swaging the fixing portion.

9. The apparatus according to claim 7, further comprising an accommodating container in which the airbag and the retainer are accommodated in a folded state, wherein the insertion opening is located in the accommodating container when the airbag is unfolded and inflated.

10. The apparatus according to claim 7, wherein the passenger compartment includes a seat for a passenger and the vehicle includes a side, wherein when a passenger is seated on the seat, a gap is formed between the passenger and the side of the vehicle, and wherein the airbag is a side airbag that unfolds and inflates in such a manner as to extend into the gap between the side of the vehicle and the passenger.

11. A method of folding an airbag for an airbag apparatus including an inflator for generating gas that unfolds and inflates the airbag and a retainer for receiving the inflator, the airbag apparatus being fixed to an accommodating portion provided in a vehicle passenger compartment through the retainer, the method comprising:

preparing the airbag in a flattened form and providing an insertion opening through which the retainer is passed;

setting at least one contact point by passing the retainer through the insertion opening of the airbag in such a manner that a portion of the retainer projects from the insertion opening and that the retainer is held in contact with an opening end of the insertion opening;

setting at least one folding line starting from the contact point and folding the airbag along the folding line; and folding the airbag in a folded state from a distal end of the airbag toward the retainer.

12. The method according to claim 11, further comprising inserting the inflator into the retainer prior to said preparing the airbag.

13. The method according to claim 11, wherein the opening end of the insertion opening has a curved portion, and wherein the contact point is set on the curved portion.

14. The method according to claim 13, wherein the inflator is a cylinder type and has an axis, and wherein the folding line is defined linearly and extends perpendicularly to the axis of the inflator.

15. The method according to claim 11, wherein the airbag has an upper section corresponding to an upper portion of the passenger compartment, wherein the insertion opening is defined in the upper section of the airbag, and wherein said setting at least one folding line includes folding the upper section of the airbag over a lower part of the airbag.

16. The method according to claim 11, wherein the airbag includes a lower section corresponding to a lower portion of the passenger compartment, wherein the insertion opening is defined in the lower section of the airbag, and wherein said setting at least one folding line includes folding the lower section of the airbag over an upper part of the airbag.

17. The method according to claim 11, wherein said folding the airbag in a folded state includes folding the airbag in a pleated manner from a distal end of the airbag to a proximal end.

* * * * *